US008551436B2

(12) United States Patent
Gary et al.

(10) Patent No.: US 8,551,436 B2
(45) Date of Patent: Oct. 8, 2013

(54) METHOD FOR PURIFYING AN INPUT MIXTURE COMPRISING CARBON DIOXIDE ($CO_2$) AND CARBON MONOXIDE (CO), TO ELIMINATE THE CARBON MONOXIDE CONTAINED IN SAID MIXTURE

(75) Inventors: Daniel Gary, Montingy le Bretonneux (FR); Florent Chaffotte, Chattillon (FR); Florence Gouhinec, Versailles (FR); Martina Ridlova, Bourg la Reine (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 1080 days.

(21) Appl. No.: 11/721,924

(22) PCT Filed: Dec. 6, 2005

(86) PCT No.: PCT/FR2005/051042
§ 371 (c)(1),
(2), (4) Date: Jun. 15, 2007

(87) PCT Pub. No.: WO2006/064146
PCT Pub. Date: Jun. 22, 2006

(65) Prior Publication Data
US 2009/0266453 A1    Oct. 29, 2009

(30) Foreign Application Priority Data
Dec. 16, 2004    (FR) .................................... 04 53014

(51) Int. Cl.
*B01D 53/14*    (2006.01)
*B01D 47/00*    (2006.01)

(52) U.S. Cl.
USPC ............................ 423/246; 423/210; 502/165

(58) Field of Classification Search
None
See application file for complete search history.

(56) References Cited

U.S. PATENT DOCUMENTS

| 4,869,883 A | * | 9/1989 | Thorogood et al. | .......... 423/219 |
| 5,955,214 A | | 9/1999 | Bellows et al. | |

(Continued)

FOREIGN PATENT DOCUMENTS

| DE | 102 51 486 | | 5/2004 |
| EP | 0832678 | * | 8/1997 |

(Continued)

OTHER PUBLICATIONS

International Search Report for PCT/FR2005/051042.

(Continued)

*Primary Examiner* — Melvin C Mayes
*Assistant Examiner* — Sheng H Davis
(74) *Attorney, Agent, or Firm* — Elwood L. Haynes; Christopher J. Cronin

(57) ABSTRACT

The invention concerns in particular a method for purifying an input mixture comprising carbon dioxide ($CO_2$) and carbon monoxide (CO), to eliminate the carbon monoxide contained in said mixture, which consists in contacting, at a temperature higher than room temperature, the input mixture with a purifying material comprising at least one metal oxide, so as to bring about the reduction of the purifying material by the input mixture, leading to oxidization of at least part of the CO of the input mixture into $CO_2$. The invention also concerns a gaseous chilling method and installation integrating such a purifying operation.

7 Claims, 2 Drawing Sheets

Site of the CO purification system in the recycle circuit.

(56) References Cited

U.S. PATENT DOCUMENTS

| | | | |
|---|---|---|---|
| 6,616,909 B1* | 9/2003 | Tonkovich et al. | 423/648.1 |
| 7,632,453 B2* | 12/2009 | Chaffotte et al. | 266/156 |
| 2002/0104589 A1* | 8/2002 | Van den Sype et al. | 148/233 |
| 2005/0065023 A1* | 3/2005 | Deevi et al. | 502/304 |
| 2006/0037678 A1 | 2/2006 | Leger | |
| 2006/0165533 A1 | 7/2006 | Jurmann et al. | |
| 2006/0210454 A1* | 9/2006 | Saxena et al. | 422/169 |

FOREIGN PATENT DOCUMENTS

| | | |
|---|---|---|
| EP | 0 832 678 | 4/1998 |
| EP | 1 060 774 | 12/2000 |
| EP | 1 138 383 | 10/2001 |
| EP | 1 211 329 | 6/2002 |
| FR | 2 863 628 | 6/2005 |
| JP | 61 227842 | 10/1986 |
| WO | WO 03 068998 | 8/2003 |

OTHER PUBLICATIONS

Patent Abstracts of Japan, application No. 60065053, Mar. 30, 1985; JP 6,122,7842, Oct. 9, 1986.

PCT/FR2005/051042 Written Opinion dated May 8, 2006.

* cited by examiner

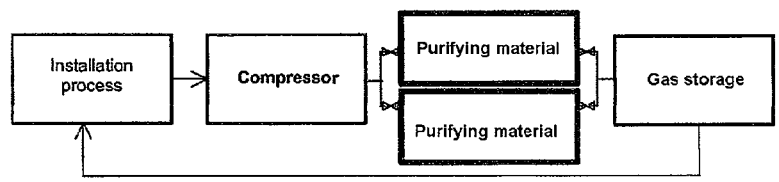
Figure 1 : Site of the CO purification system in the recycle circuit.
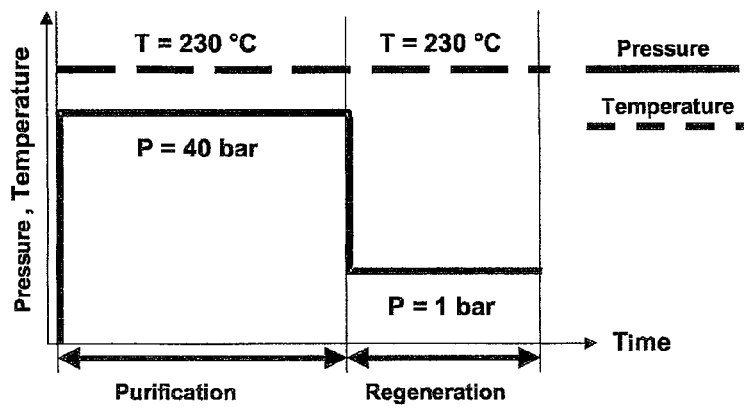
Figure 2 : Schematic description of an operating cycle (composed of a CO purification step and a purifying material regeneration step).

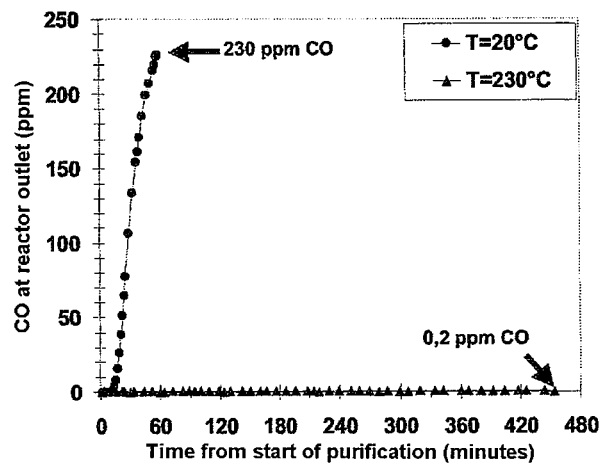
Figure 3 : Influence of temperature (at 20°C and 230°C) on the CO purification capacity of the BASF R3-11 material.
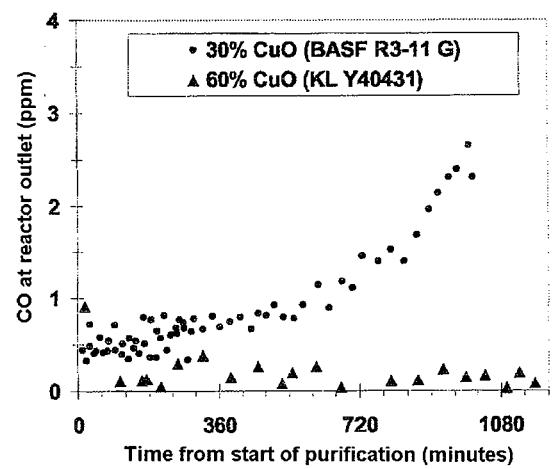
Figure 4 : Influence of CuO content of the purifying material on the CO purification capacity.

METHOD FOR PURIFYING AN INPUT MIXTURE COMPRISING CARBON DIOXIDE ($CO_2$) AND CARBON MONOXIDE (CO), TO ELIMINATE THE CARBON MONOXIDE CONTAINED IN SAID MIXTURE

This application is a 371 of International PCT Application PCT/FR2005/051042, filed Dec. 6, 2005.

BACKGROUND

The present invention relates to a method for purifying a gas mixture comprising carbon dioxide ($CO_2$) and helium (He) by removing the carbon monoxide (CO) also contained in said mixture.

The use of gas mixtures containing $CO_2$, such as $CO_2$—He mixtures, is known for their heat transfer properties, particularly in methods for gas quenching of metal parts. In such a context, the formation of CO is promoted therein, simply due to the reactivity of the $CO_2$ at high temperature (above 500° C.).

Moreover, for economic reasons, the presence of helium in such a gas justifies and generally necessitates the recycling of the quenching gas. This recycling may give rise to an accumulation of impurities such as CO.

This presence of CO may raise problems in case of leakage of the gas in the recycle system, due to the well known toxicity of CO. The maximum allowable exposure to CO in France today is 50 ppm of CO, but from Jan. 1, 2005, this limit will be lowered to 10 mg/m³.

It would therefore be advantageous to be able to propose a method for removing the carbon monoxide from a gas mixture comprising $CO_2$ and helium.

The gas quenching of steels having previously undergone vacuum heat treatment (heating before quench, annealing, stress relief, etc.) or thermochemical treatment (case hardening, carbonitriding, etc.) is generally carried out with a pressurized gas, preferably under a pressure of between 4 and 20 bar. The gas may be nitrogen, air, argon, $CO_2$, helium-based mixtures, or any other industrial gas or gas mixture, and is generally supplied from a temporary storage unit or buffer vessel, where the gas is maintained under a pressure higher than the desired quenching pressure, or typically 30 to 40 bar for a quench at 20 bar.

A quenching cycle after vacuum case hardening is conventionally broken down as follows:

Initial status of the installation: the chamber in which the quenching is carried out is initially under vacuum, that is, under a pressure generally between 1 and 20 mbar; the load to be quenched is placed inside the chamber.

Introduction of quenching gas: filling the quenching chamber with quenching gas serves to increase the pressure to the quenching pressure in a few seconds by balancing the pressures with the buffer storage; the gas injected is recirculated throughout the quenching time, and then removed at the end of the quench.

The improvements made in recent years to rapid steel cooling processes have essentially consisted in the use of fluids having better heat exchange properties, such as helium and hydrogen, mixtures of an inert gas with a lighter gas ($N_2$—$H_2$, $N_2$—He, etc.), and higher gas pressures and flow rates in the pressurized chamber. At the same time, quenching cell technologies have also been improved: higher operating pressures, higher capacity of heat exchangers, etc.

Some gases, such as $CO_2$, used in mixtures, particularly with helium, serve to improve the cooling rates of steel parts. However, contact between the $CO_2$ and the hot parts to be quenched may give rise to the formation of CO by chemical reaction of the $CO_2$. The accumulation of CO formed is particularly undesirable and is liable to occur in cases in which the gas should be recycled (in fact, in the absence of recycling, the quenching gas is simply removed to the exterior, thereby avoiding any accumulation).

Installations for recycling quenching gas sometimes propose means for stripping the impurities, for example in the case in which the quench does not follow a vacuum treatment. The means proposed for purifying the recycled quenching gases are generally based on membranes; however, these have the drawback of causing a high pressure drop in the gas, and this pressure drop generally requires the use of a dedicated compressor and causes higher energy consumption.

Other documents propose $CO_2$ purification methods (in the presence or absence of helium) aimed to remove the CO. The methods proposed in this case are chemical reactions causing the oxidation of CO by a gaseous agent on a catalyst. Reference can be made to the following documents:

EP-1060 774 which proposes removal of (inter alia) CO and $CO_2$ from the air. The CO is oxidized to $CO_2$ by catalytic oxidation in the presence of catalysts based on precious metal such as Pd, Os, Ir, Rh, Ag, Au, Re or Pt, the $CO_2$ formed is considered as an impurity, and is removed subsequently by adsorption on zeolites.

EP-1 138 383 which proposes removing the CO from a mixture comprising hydrogen and CO. This document proposes the oxidation of the CO to $CO_2$ by catalytic oxidation in the presence of catalysts based on Ru, Ti, $Al_2O_3$. An additional oxygen injection completes the oxidation of CO.

EP-0832678 which proposes removing the CO and $CO_2$ from an inert gas, argon. The CO is oxidized to $CO_2$ by catalytic oxidation using excess oxygen, in the presence of catalysts based on NiO, CuO, or MnO and mixtures thereof, and also on noble metals. The $CO_2$ thus formed is considered as an impurity and is removed subsequently by adsorption. It should also be observed that the oxygen added—which is deliberately added in excess—must also be removed at the end of the process.

These prior documents call for the following comments:

the purification of the CO requires the action of a oxidizing agent such as oxygen, and the oxidation is carried out using oxygen on a catalyst;

they raise a problem of cost related to the use of noble metals (for example Pd, Ru, Ti);

the $CO_2$ generated is considered as an impurity to be removed;

the complete removal of the CO demands an excess of oxygen, which in turn requires a subsequent purification step for removal.

Other further documents propose the purification of CO by adsorption based on the selective removal of the various components by adsorbents through specific interactions between the surface of the solid adsorbents and the molecules of gas to be purified (chemisorption, physisorption). One of the essential features of the adsorption technology resides in its cyclic operation, because after an adsorption phase, the adsorbents must be regenerated partially or completely for subsequent use. The purification of helium by adsorption is known, inter alia, for removing CO. The purification is carried out at very low temperature (−187° C.) using a zeolite X type adsorbent (silicoaluminate enriched with cations such as Ag, Cu, Li). Reference can be made for example to document EP-922480. Such low temperatures require perfect thermal insulation and therefore incur higher production costs.

A reading of the above reveals the existence of a genuine need to propose a method for the selective purification of CO from a mixture comprising helium and $CO_2$ while preserving the presence of $CO_2$ in the mixture, which is economically profitable, and which avoids in particular the need to use oxidizing gaseous agents.

As shown in greater detail below, according to the present invention, the gas to be purified is a gas comprising CO and $CO_2$, optionally in a mixture with another gas, particularly inert (like He, $N_2$, etc.), the mixture being, for example, used for a gas quenching operation, and in the latter case, this purification is preferably carried out in a comprehensive quenching gas recycling operation.

The main features and advantages of the CO purification method of the present invention can be summarized as follows:

- the purification is selective, the other components of the gas mixture (and particularly $CO_2$) are not significantly removed during the purification;
- the purification is preferably carried out on a compressed gas (typically 10 to 50 bar) in order to favor the physical and chemical reactions leading to the removal of CO and preferably in a recycling circuit (as shown in greater detail below, the higher the pressure, the higher the purification efficiency);
- the purifying material is based on a metal oxide, such as copper oxide (for example, in a content of between 30 and 60% of CuO), Ni oxide, Mn oxide and/or mixtures thereof such as hopcalite (CuO+$MnO_2$);
- the method can be carried out at ambient temperature, but preferably between 100 and 250° C. (understandably represents a moderate temperature);
- it requires neither auxiliary gases nor precious metals to carry out the purification, and actually makes use of inexpensive (25 to 30 euros/kg) and readily available purifying materials;
- it does not require the production of deposits of active layers;
- the purifying materials are regenerated, for example, with dehydrated air, at atmospheric pressure and preferably at a temperature substantially equal to the temperature used for the purification phase; in fact, the purifying material can thereby be kept at substantially constant temperature throughout the steps of its operation. The only type of temperature control required is therefore maintenance at constant temperature. No transition phase from one temperature setpoint to another is necessary between the purification phase and the regeneration phase;
- the only product formed is $CO_2$, already present and desirable in the input gas to be purified, and which is therefore not a "pollutant" in the context of the present invention;
- the purification reactor generates a slight pressure drop, and therefore does not create a need for additional compression.

The purification of CO according to the present invention is based on the interaction between the purifying material (oxide) and the CO molecules to be purified. Depending on the operating temperature selected, the CO is trapped in the pore volume of the purifying material and/or chemisorbed on the metal oxide of the purifying material and/or oxidized with the oxide present in the purifying material. Thus, if the purification can be carried out at ambient temperature, it is carried out according to the invention at a temperature above ambient temperature, and more preferably between 150 and 250° C., in order to bring about, during the contact, the reduction of the purifying material by the input mixture, leading to oxidation of the CO in the input mixture to $CO_2$.

In fact, at ambient temperature, the main purification mechanism is the adsorption of CO on the oxide of the purifying material, whereas at higher temperature (for example 230° C.), another mechanism is added to this adsorption mechanism, that is, the reduction of the metal oxide of the purifying material (for example in the case of copper, to $Cu_2O$ or copper metal) by the input mixture comprising $CO_2$ and CO, leading to the oxidation of the CO to $CO_2$:

$$2CO+2CuO \rightarrow CO+CO_2+Cu_2O \rightarrow 2CO_2+2Cu.$$

It may therefore be immediately observed that compared with the prior art discussed above, in which the oxide played a catalyst role, the present invention involves a direct reaction, oxidation, between the CO to be purified and the oxide of the purifying material.

Remaining with the example of copper, during the purification at 230° C., the purifying material changes color—before purification, it is black (oxidation state +II) and after purification, it is reddish brown (oxidation state +I or 0).

The present invention accordingly relates to a method for purifying an input mixture comprising carbon dioxide ($CO_2$) and carbon monoxide (CO), to remove the carbon monoxide contained in said mixture, by contacting, at a temperature above ambient temperature, the input mixture with a purifying material comprising at least one metal oxide, so as to bring about the reduction of the purifying material by the input mixture, leading to oxidation of the CO in the input mixture to $CO_2$.

As may be understood from the above discussion, depending on the temperature applied, a more or less significant physisorption and/or chemisorption is observed in the mechanisms involved, but the desirable and dominant mechanism of the present invention is in all cases a direct oxidation between the purifying material and the CO to be purified.

The present invention further relates to a method for recycling a process gas used in an upstream process implemented in an upstream installation, a process gas comprising carbon dioxide ($CO_2$) and carbon monoxide (CO), a recycling carried out to remove the carbon monoxide (CO) contained in said mixture, and the reintroduction of the gas thereby purified into said upstream process, whereby a main line connects said upstream installation to a buffer vessel via a group of compressors or boosters comprising one or more compressors/boosters in parallel, suitable for the recovery and recompression of all or part of the process gas issuing from said installation, in order to bring it into contact, at a temperature above ambient temperature, with a purifying material comprising at least one metal oxide, in order to bring about the reduction of the purifying material by the recovered process gas, leading to oxidation of the CO in the process gas to $CO_2$, the process gas thereby purified being then sent to the buffer vessel to be stored before its re-use in said upstream process.

The present invention further relates to a gas quenching method comprising a quenching cell for receiving objects to be quenched using a quenching gas, and comprising pressurized quenching gas supply means, connected to said cell, the gas supply means comprising a buffer vessel suitable for containing quenching gas, characterized in that, after a quenching operation, all or part of the gas contained in the cell is recycled as follows:

- a main line connects the cell to said buffer vessel via a group of compressors or boosters comprising one or more compressors/boosters in parallel;

the portion of main line located between the group of compressors and the buffer vessel comprises at least one reserve of purifying material comprising at least one metal oxide;

after a quenching operation, the contents of the cell are partially drained in one or more operations, using the group of compressors, in order to bring the recovered quenching gas into contact, at a temperature above ambient temperature, with said at least one reserve of purifying material, so as to bring about the reduction of the purifying material by the recovered quenching gas, leading to the oxidation of the CO in the quenching gas to $CO_2$, the quenching gas thereby purified being then sent to the buffer vessel to be stored therein before its re-use in said gas quenching method.

The present invention further relates to a gas quenching installation of the type comprising:

a quenching cell for receiving objects to be quenched;

pressurized quenching gas supply means, connected to said cell, the gas supply means comprising a buffer vessel suitable for containing the quenching gas;

a main line connecting the cell to said buffer vessel via a group of compressors or boosters comprising one or more compressors/boosters in parallel;

the portion of main line located between the group of compressors and the buffer vessel comprises at least one reserve of purifying material comprising at least one metal oxide;

so that, after a quenching operation, the contents of the cell are partially drained in one or more operations, using the group of compressors, in order to bring the recovered quenching gas into contact, at a temperature above ambient temperature, with said at least one reserve of purifying material, so as to bring about the reduction of the purifying material by the recovered quenching gas, leading to oxidation of the CO in the quenching gas to $CO_2$, the quenching gas thereby purified being then sent to the buffer vessel to be stored therein before its re-use in said gas quenching method.

In the preferred embodiments of the invention according to its various aspects, use may optionally be made of one and/or the other of the following arrangements:

said at least one metal oxide is a copper oxide;

said copper oxide is CuO;

said purifying material comprises at least 30% of a copper oxide;

said temperature used for the contacting is at least 100° C., preferably at least 150° C.;

the input mixture is under a pressure of at least 10 bar, preferably at least 20 bar;

said contacting is brought about during a contact time of at least 2 seconds, preferably at least 5 seconds.

It should be observed that the residence time τ (or contact time) can also be defined as follows:

$$\tau = \frac{V}{A \cdot \frac{T}{P \cdot 273.15}}$$

where V is the volume of purifying material present in the reactor expressed in liters, A is the gas flow rate passing through the purification reactor (in l/s), T is the purification temperature in Kelvins, P is the purification pressure in bar absolute;

the mass of purifying material (M) used for bringing about said contacting, the volume of gas $V_{gas}$ treated between two regenerations, and the CO content of the gas to be purified (input mixture or process gas or quenching gas) are related by the following equation:

$$\frac{M_{kg}}{CO \cdot \text{Volume gas}} \geq 5, \text{ preferably} \geq 10$$

The invention will be better understood from a reading of the description that follows, provided exclusively as an example and with reference to the drawings appended hereto, in which:

FIG. 1 is a schematic description of a gas quenching installation incorporating a CO purification installation of the invention;

FIG. 2 is a schematic description of an operating cycle composed of a CO purification step and a purifying material regeneration step;

FIG. 3 and FIG. 4 show the purification results obtained according to the invention.

FIG. 1 offers a better view of the site of the purification system in the recycle circuit according to one embodiment of the invention. The gas leaving the quenching cell ("installation process") is compressed using a compressor (the outlet pressure is about 20 to 50 bar). To guarantee operating continuity, the purifying material is divided into two distinct zones/reserves corresponding to two cartridges of purifying material, one for treating the gas recovered in order to remove the CO impurity, while the other is in the regeneration phase. The purified gas is recovered at the outlet of the purification reserve to be stored in the storage unit (buffer vessel) for subsequent re-use in the quenching process.

Before a first use, the purifying material must be activated: the activation is intended to dehydrate the purifying material. The cartridge containing the purifying material is, for example, heated under nitrogen, for example at a temperature close to 200° C., and this material is then oxidized, for example in dry air at a temperature close to 230° C. The activation only needs to be carried out once in the method.

The material is then ready for use. The purification process of the invention is then typically composed of 2 steps:

the CO purification step: the mixture to be treated (particularly comprising $CO_2$ and CO and also helium) passes through one of the cartridges, containing the purifying material. This purification step is preferably carried out between 100 and 250° C., more preferably at a temperature above 150° C. The cartridge and the material are maintained at a constant temperature by electric heating. As previously understood, part of the CO present in the gas to be purified is generally adsorbed (physisorbed or chemisorbed) on the material; however, the remainder is mainly oxidized to $CO_2$ by the metal oxide, for example copper oxide CuO (copper II which is therefore reduced to copper 0 or I). Part of the $CO_2$ formed may be adsorbed on the purifying material.

Still remaining with the example of copper oxide CuO, the CO is no longer stopped (converted) in the absence of enough copper oxide in oxidation state +II available in the purifying material, and when the material has reached its adsorption capacity limit. It is therefore necessary to carry out regeneration operations regularly on the material, to restore it to its initial state before purification;

the purifying material regeneration step: regeneration in practice is mainly a re-oxidation of the copper 0 or I (converted to this oxidation state during the purification step) to copper II; regeneration is also intended to desorb the CO and optionally the $CO_2$ adsorbed by the purifying material. This function is performed by scavenging with dry air for example, at a temperature close to 230° C. for example, and at a pressure equal to atmospheric pressure for example (during regeneration, an attempt is made to maximize the contact time between the material and the dry air, explaining why the gas flow rate used for the purifying material regeneration step is much lower than the flow rate of gas to be purified which passes through the purifying material during the purification step; under these conditions, the sufficient pressure for bringing about regeneration is typically atmospheric pressure, although an optional increase in the regeneration pressure would basically improve the regeneration);

the elution of CO drops after about 20 to 40 minutes of dry air scavenging.

An example of a purification and regeneration cycle is described in greater detail below in FIG. 2.

It may be observed therein that the purifying material is kept at constant temperature (for example 230° C.), throughout the steps of its operation (purification and regeneration). The only type of temperature control required is hence a maintenance at constant temperature.

As to the adjustment of the pressure in the purification reactor, a change in operating pressure is made between the purification phase (operating for example at 40 bar) and the regeneration phase (for example atmospheric pressure).

FIGS. 3 and 4 below show examples of results obtained according to the invention, the gas to be purified issuing from a gas quenching cell. They were obtained in the following experimental conditions:

gas to be purified: the gas contains a certain quantity of CO (indicated in each example below), 60% $CO_2$ and the remainder helium;

pressure in the purification reactor: 4.5 bar or 25 bar;

rate of gas to be purified: 180 or 270 liters/hour;

gas residence time in the purification reactor: 9 or 25 s;

with the residence time $\tau$ (or contact time) defined by the following equation:

$$\tau = \frac{V}{A \cdot \frac{T}{P \cdot 273.15}}$$

where V is the volume of purifying material present in the reactor expressed in liters, A is the gas flow rate passing through the purification reactor (in l/s), T is the purification temperature in Kelvins, P is the purification pressure in bar absolute;

purifying material: based on CuO, reference R3-11G from BASF (containing 30% CuO) and reference Y40431 from Kata Leuna (containing 60% CuO);

purification temperature: two temperatures were tested, 20° C. and 230° C.

The results obtained can be summarized as follows:

(A) Influence of Temperature

Co purification results at ambient temperature and at 230° C. are shown in FIG. 3. The initial CO content in the mixture to be treated was close to 300 ppm, the gas flow rate 270 l/h, the pressure 4.5 bar and the contact time in the purification reactor was 25 s. It may be observed that at 25° C., the breakthrough of CO begins after 15 minutes of purification, whereas at 230° C., it has not taken place even after 8 hours of purification. As may be understood by observing the figure, the breakthrough is defined as the time elapsed from the start of purification from which point the CO is no longer completely stopped (converted) by the purifying material (from this point, CO is observed to leave the reactor). It may be concluded that the increase in purification temperature improves the CO purification capacity.

(B) Influence of Pressure

Tests conducted at 20° C. at higher pressure showed a significant improvement in the purification efficiency of the purifying material. This can be attributed to the increase in contact time between the purifying material and the mixture to be purified, obtained because of this pressure increase, according to the formula for contact time $\tau$ recalled above. In fact, the higher the purification pressure, the longer the gas containing CO remains in contact with the purifying material, and therefore the higher the CO purification efficiency.

(C) Influence of CuO Content of the Purifying Material

The influence of the CuO content of the purifying material on the CO purification capacity is shown in FIG. 4. The initial CO content of the mixture to be treated was close to 430 ppm, the gas flow rate was 187 l/h, the pressure 25 bar and the contact time in the purification reactor was 9 s, the purification being carried out at a temperature of 230° C. It may be observed that after 4 hours of purification, the CO content at the reactor outlet begins to rise for the purifying material containing 30% CuO. The material containing 60% CuO continues to purify the CO without the breakthrough appearing (the test was stopped after 20 hours of purification).

It may be concluded that the performance of the purifying materials based on CuO increases with their CuO content.

By way of example, it has been observed that a material containing 60% CuO by weight has a purification capacity above 100 $Ncm^3/g$.

In consequence, such a purifying material, characterized by a purification capacity of about 100 $Ncm^3$ CO/g of purifying material, is capable of treating 600 $Nm^3$ of feed gas containing 500 ppm CO between two regenerations, that is, without saturation of the material.

(D) Purification Selectivity

The Applicant has confirmed with an accuracy of 1% that both at 20° C. and at 230° C., the purifying material used does not stop the $CO_2$.

(E) Regeneration Time

During its regeneration, the quantity of CO eluted drops after about 20 minutes of dry air scavenging. It may therefore be concluded that this speed of regeneration would even make it possible to use a single cartridge of purifying material instead of two cartridges.

In conclusion, the present invention serves to efficiently remove the carbon monoxide contained in a gas stream by reducing its concentration below 2 ppm, that is, to a level virtually undetectable by most analyzers.

The simplicity of implementation of the invention is characterized primarily by the absence of use of an ancillary oxidizing gas stream such as oxygen to remove the CO: by itself, an interaction between the purifying material used and the gas to be purified suffices. This feature of the invention also eliminates the need for a subsequent oxygen purification step. Furthermore, the purification method proposed in connection with the present invention is implemented at moderate temperatures, readily accessible, without complex control. Finally, the pressure drop associated with the purification system described in the present invention is negligible, so that no compression step specifically dedicated to the purification part is necessary in the context of the present invention.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A gas quenching method comprising a quenching cell for receiving objects to be quenched using a quenching gas, and comprising pressurized quenching gas supply system means, connected to said cell, the gas supply system means comprising a buffer vessel suitable for containing quenching gas, characterized in that, after a quenching operation, all or part of the gas contained in the cell is recycled as follows:
   a) a main line connects the cell to said buffer vessel via a group of compressors or boosters comprising one or more compressors/boosters in parallel;
   b) the portion of main line located between the group of compressors and the buffer vessel comprises at least one reserve of purifying material comprising a copper oxide; and
   c) after a quenching operation, the contents of the cell are partially drained in one or more operations, using the group of compressors, in order to bring the recovered quenching gas into contact, at a temperature above ambient temperature, with said at least one reserve of purifying material, so as to directly oxidize at least part of the CO in the recovered quenching gas to CO2 with the copper oxide, the quenching gas thereby purified being then sent to the buffer vessel to be stored therein before its subsequent re-use in said gas quenching method,
   wherein the purifying material requires neither an auxiliary gas nor precious metals to carry out the oxidation,
   and further wherein the CO2 is not removing from quenching gas during the gas quenching method.

2. The method of claim 1, wherein said copper oxide is CuO.

3. The method of claim 1, wherein said purifying material comprises at least 30% of said copper oxide.

4. The method of claim 1, wherein said temperature used for the contacting is at least 100° C.

5. The method of claim 1, wherein the input mixture is under a pressure of at least 10 bar.

6. The method of claim 1, wherein said contacting is brought about during a contact time of at least 2 seconds.

7. The method of claim 1, further comprising a step of regenerating the copper oxide after a volume $V_{gas}$ of quenching gas has been recycled, wherein the CO content of said quenching gas, the volume of gas to be treated between two regenerations $V_{gas}$, and the mass of purifying material used, are such that:

$$\frac{M_{kg}}{[CO] \cdot V_{gas}} \geq 5.$$

* * * * *